F. J. PERKINS, DEC'D.
S. J. P. SMITH, ADMINISTRATRIX.
PRESS.
APPLICATION FILED MAR. 3, 1913.

1,115,013.

Patented Oct. 27, 1914.

WITNESSES:

INVENTOR.
FRANKLIN J. PERKINS, Deceased; by
SYVILLA J. PERKINS SMITH,
Administratrix.
BY

ATTORNEY.

F. J. PERKINS, DEC'D.
S. J. P. SMITH, ADMINISTRATRIX.
PRESS.
APPLICATION FILED MAR. 3, 1913.

1,115,013.

Patented Oct. 27, 1914.

Fig. 3.

Fig. 5.

WITNESSES:
Wesley C Rocke
J. Murphy

INVENTOR:
FRANKLIN J. PERKINS, Deceased; by
SYVILLA J. PERKINS SMITH,
Administratrix.
BY
Jas. H. Churchill
ATTORNEY.

UNITED STATES PATENT OFFICE.

FRANKLIN J. PERKINS, DECEASED, BY SYVILLA J. PERKINS SMITH, ADMINISTRATRIX, OF PEABODY, MASSACHUSETTS, ASSIGNOR TO HOLDER-PERKINS COMPANY, OF WOBURN, MASSACHUSETTS, A CORPORATION OF MASSACHUSETTS.

PRESS.

1,115,013.     Specification of Letters Patent.     Patented Oct. 27, 1914.

Application filed March 3, 1913. Serial No. 751,687.

*To all whom it may concern:*

Be it known that I, SYVILLA J. PERKINS SMITH, a citizen of the United States, and a resident of Peabody, in the county of Essex and State of Massachusetts, administratrix of the estate of FRANKLIN J. PERKINS, late a citizen of the United States, deceased, believe that the said FRANKLIN J. PERKINS did invent an Improvement in Presses, of which the following description, in connection with the accompanying drawings, is a specification, like letters on the drawings representing like parts.

This invention relates to a power operated press, such as shown and described in U. S. Patent No. 981468 issued Jan. 10, 1911, and has for its object to improve the same in certain features as will be described.

Figure 1:
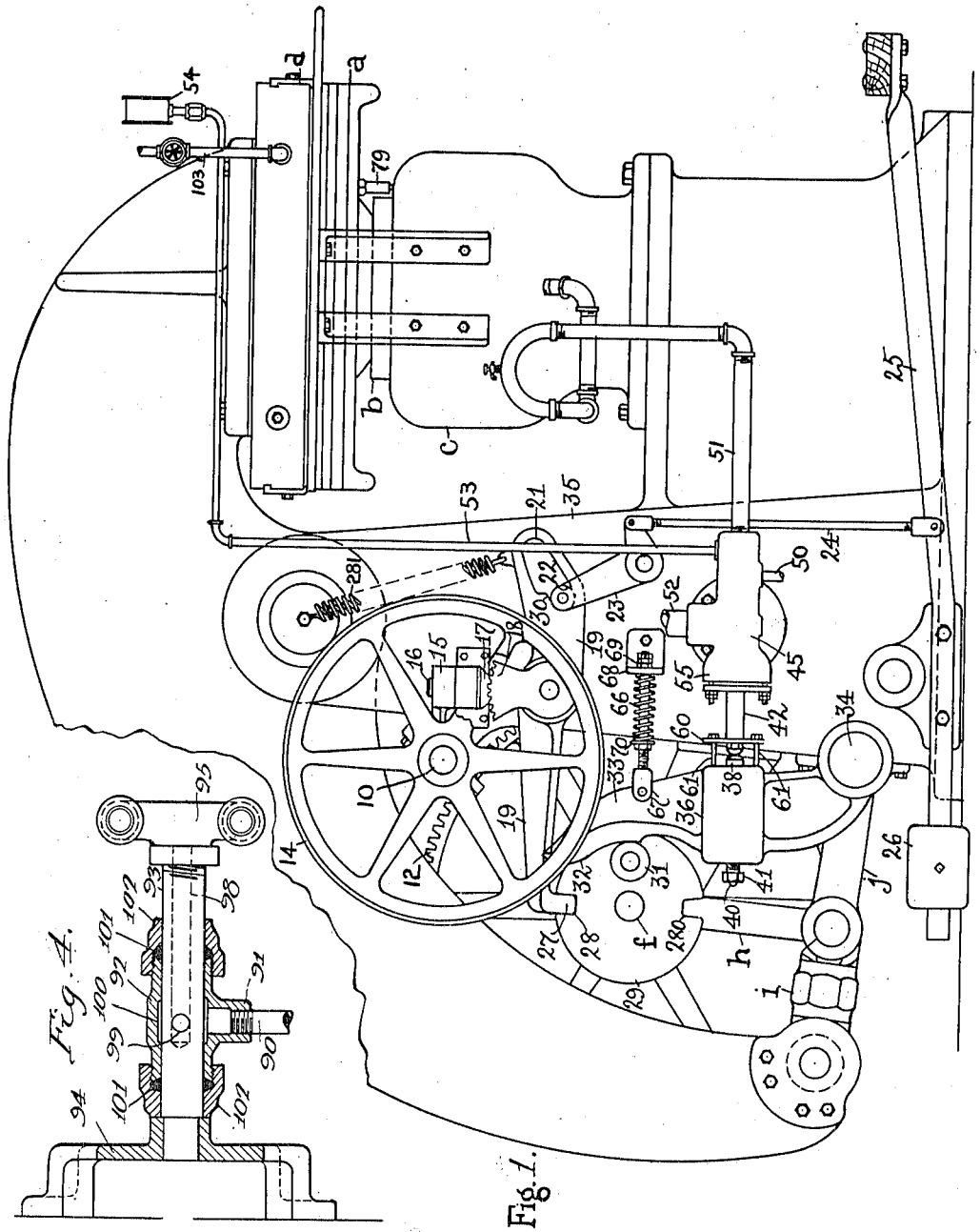
Figure 2:
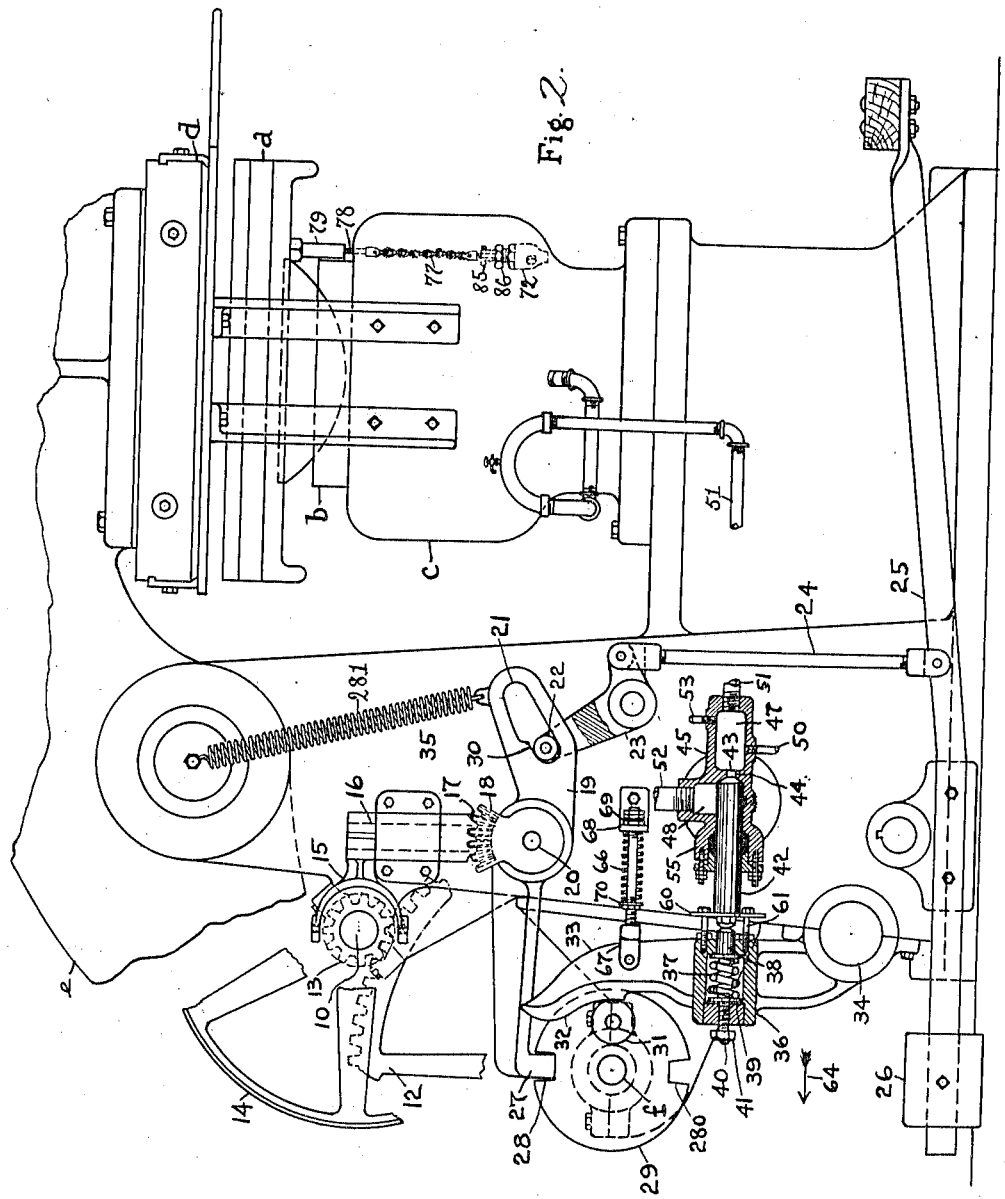

Figure 1 is a side elevation of a power operated press embodying this invention. Fig. 2 a view like Fig. 1 with parts in section. Fig. 3, an opposite side elevation of the press in its open position. Fig. 4, a detail to be referred to, and Fig. 5 a detail of the safety valve shown in Fig. 2.

The construction of the power operated press herein shown is in the main the same as that shown and described in the patent referred to, to which reference may be had for a full description of the same.

The press is provided with a lower platen $a$ supported upon a piston or ram $b$ located in a cylinder $c$ and movable by fluid pressure admitted into the lower end of said cylinder. The lower platen $a$ coöperates with an upper platen $d$ secured to a lever $e$, which is operated from a crank shaft $f$ by a crank $g$, link $h$ and toggle levers $i$, $j$. The crank shaft $f$ is driven from a main shaft 10 by a large gear 12 and pinion 13. The upper platen $d$ is lowered into its operative position when the toggle levers $i$, $j$ are straightened as shown in Fig. 1, and is raised into its inoperative position when the toggle levers are broken as shown in Fig. 3. The main shaft 10 is provided with a driving pulley 14, which is normally loose thereon and is designed to be rendered fast thereon by a suitable clutch, not shown, but which may be of any suitable construction and whose movable member is operated by a forked arm 15, see Fig. 2, fast on an upright rock shaft 16, suitably supported by the framework of the press and provided at its lower end with a bevel gear 17, which is engaged by a segmental gear 18 fast to a lever 19 mounted on a pivot 20. The lever 19 constitutes the stop lever for the crank shaft $f$ and is provided at one end with a slot 21, which is engaged by a roller 22, carried by a bell crank lever 23, whose short arm is joined by a link 24 with a foot treadle 25, provided with a counterweight 26.

The slot 21 in the stop lever is upwardly inclined, so that, when the foot treadle is depressed, the roller 22 will turn the stop lever so as to withdraw a finger 27 thereon, from a notch 28 in the periphery of a disk 29, fast on the crank shaft $f$, and at the same time move the segmental gear 18, so as to rotate the rock shaft 16 and move the clutch operating arm 15, so as to throw the clutch into its operative position and clutch the driving pulley 14 to the main shaft 10, thereby causing the latter to turn and through the gears 13, 12 rotate the crank shaft $f$ a half turn, so as to straighten the toggle and lower the upper platen into its operative position. As soon as the crank shaft $f$ is set in motion, the unnotched portion of the periphery of the stop disk 29 passes under the finger 27 and holds the clutch in its operative position, while allowing the operator to remove his foot from the treadle, which can be raised for a part of its upward movement by the counterweight 26.

The slot 21 is provided at its front end with a narrow portion 30 of a width substantially equal to the diameter of the roller 22 on the lever 23, so that, when the said roller is entered into the narrow portion, the stop lever 19 is held from any material oscillation, thereby preventing accidental disengagement of the stop lever from the stop disk, by the rebounding of the finger 27 out of the notch in the stop disk, thereby avoiding accidental repeating of the press.

The lower platen $a$ is raised by fluid, such as water, which is forced by a pump (not shown) through a normally open circuit of pipes, with which the cylinder c is connected, in the manner described more fully in the patent referred to, and one of the features of the present invention consists in a novel construction of apparatus for operating the valve by which said circuit is interrupted, when it is desired to apply the fluid pressure to the lower platen. To this end, the stop disk 29 is provided on one face with a roller 31, see Fig. 3, which coöperates with a cam surface 32 on the upper part of a lever 33, pivoted at 34 to the hollow standard or upright 35, which supports the lever e.

The lever 33 is provided with a hollow boss 36, within which is located a helical spring 37, which is interposed between a button 38 and a bearing disk 39 which is attached to a threaded rod 40 extended through the rear wall or head of the hollow boss 36 and engaged by a nut 41 outside of said boss, The front end of the spring bears against the rear end of the button 38, and normally forces the front end of the same through an opening in the front wall or head of the hollow boss 36 and against the end of a cylindrical rod 42, which constitutes a valve and coöperates with a port or opening 43 in a partition wall 44 of a valve fitting 45, which is connected in the fluid circulating circuit.

As represented in Fig. 2, the valve fitting 45 is separated into two chambers 47, 48, which are connected by the port or opening 43; and the chamber 47 is provided with a fluid inlet pipe 50, which is connected with the pump, not shown, and by the branch pipe 51 with the cylinder c, and the chamber 48 is provided with a fluid outlet pipe 52, which is connected with the hollow standard 35 or other source of fluid supply with which the pump referred to is connected to take fluid therefrom, after the manner described in the patent referred to. The chamber 47 is connected by the pipe 53 with a pressure gage 54. The valve fitting 45 is provided with a stuffing box 55 through which the cylindrical valve 42 moves. The valve 42 is connected with the lever 33 to be moved thereby into its open position, and is also so connected with said lever as to permit it to be moved into its open position independently of the said lever by an excess of fluid pressure in the chamber 47. In the present instance the valve 42 has attached to it a plate 60, through which are loosely extended headed bolts or screws 61, which engage threaded sockets in the hollow boss 36, and with the heads of which the plate 60 is normally engaged by the spring 37, which forces the button 38 against the end of the valve 42. As a result, the valve 42 is capable of being moved into its open position by the lever 33, when the latter is moved in the direction of the arrow 64, 65 Fig. 3, and is also capable of being moved into its closed position by the lever 33 acting through the spring 37 and button 38, when the said lever is moved into the position shown in Fig. 3, and further when the valve 42 is in its closed position shown in Fig. 3, it is capable of being moved into its open position by an excess of fluid pressure in the chamber 47. The lever 33 is moved into what may be termed its operative position so as to close the valve 42, by the pin or roller 31 on the stop disk 29, and is moved into its inoperative or starting position by a spring 66, which encircles a rod 67 pivoted at one end to the lever 33 and having its other end extended through a hole in a bracket or arm 68 attached to the standard 35, and provided with a nut 69, which is normally held against the bracket by the spring 66, which acts at one end against the bracket and at its other end against a nut 70 on the rod 67.

From the above description and by reference to Fig. 3, it will be seen, that the lever 33 which controls the valve 42 is actuated by the stop disk 29 to close the said valve, when the upper platen is in its operative or lowered position. Provision is also made for safeguarding the press from an excessive pressure in the cylinder c, in case the valve 42 should for any reason fail to be opened by the excessive pressure. To this end, the cylinder c containing the piston or ram b has connected with it, preferably near its lower end, a valve fitting 72, see Fig. 5, which is provided with a chamber 73, having a fluid inlet 74 and a fluid outlet 75. The inlet 74 is connected with the cylinder c and the outlet 75 with the atmosphere or with a suitable waste receptacle. Within the chamber 73 is a valve 76, which normally closes the waste outlet 75 and which is designed to be mechanically connected with the lower platen a, so as to be opened thereby, when said platen reaches a predetermined point in its upward movement. In the present instance the mechanical connection between the platen a and valve 76 is shown as a chain 77 having one end attached to a threaded rod 78, which engages a threaded socket in a rod 79, screwed to the lower platen a, said chain having its other end connected to a removable head 80 on the reduced portion 81 of the stem 82, of the valve 76, said reduced portion being encircled by a spring 83, which bears at one end against a shoulder 84 on the valve stem, and at its other end against a threaded sleeve or nut 85, which engages a cylindrical member 86 of a stuffing box, in which the spring 83 is located and between which and a coöperating cylindrical member 87 is interposed packing 88 of suitable material, said coöperating member 87 being in threaded engagement with the valve fitting 72. The valve 76 is held to its seat by the spring 83, whose strength or compression can be regulated by the threaded sleeve 85, and any leak along the valve stem can be taken care of by means of the cylindrical member 86 of the stuffing box.

When the lower platen *a* is in its lowermost position, the chain 77 is slack and the valve 76 is held in its closed position by the spring 83, and remains closed as long as the lower platen is below a predetermined position, and under normal conditions the lower platen is not raised to the predetermined position, for before it reaches said position, the pressure in the cylinder *c* reaches the point at which the valve 42 is opened, and the circuit for the fluid is opened, and the pump merely circulates the fluid and prevents the pressure increasing on the cylinder *c* above the predetermined point. If, however, the valve 42 should fail to open when the pressure reaches the predetermined point, or if, when the valve 42 is open and the upper platen is in its elevated position, the port 43 should be accidentally closed in any manner, the lower platen would be raised to a higher point, at which latter the valve 76 is opened, and the pressure in the cylinder is thereby relieved and prevented from increasing to the point where it would lift the platen *a* to a position where it would be dangerous to the press, and might break, strain or otherwise damage the same.

The upper platen *d* is hollow and is supplied with steam or other fluid to heat the same, and as the upper platen is movable, provision is made for providing a supply pipe for the platen, which is capable of movement and yet be steam tight. To this end is employed the construction shown in Figs. 3 and 4, wherein 90 represents the steam supply pipe, which is connected at its front end to the hollow upper platen *d* and has its rear end in threaded engagement with a nipple 91 on a sleeve 92, which is mounted to turn on a stud shaft 93, secured at one end to a bracket 94 and having attached to its opposite end a substantially U-shaped coupling 95, to the arms of which are secured a pipe 96 leading from the boiler or other source of heat, and a second pipe 97 which may be attached to the coupling 95 and used as a water supply to cool the platen *d*. In practice the pipes 96, 97 may be provided with usual shut off valves. The stud shaft 93 is provided with a central passage 98, which extends from its front end toward the longitudinal center of the said shaft and from which extends a radial passage 99, which is in open communication with an annular groove 100 on the inner surface of the sleeve, with which the nipple 91 communicates. The sleeve 92 is free to turn on the shaft 93 and is rendered steam tight at its ends by packings 101 interposed between the ends of the sleeve and collars 102 fast on the said sleeve, and into which the ends of the shaft extend. The steam passes through the passage 98 in the shaft 93 and through the radial passage 99 into the annular groove 100, and thence through the nipple 91 and pipe 90 into the hollow platen *d*, from which it may pass by the pipe 103, see Fig. 1. It will be observed that when the upper platen *d* is raised and lowered, the steam pipe 90 is free to move with it, as the sleeve 92 turns on the shaft 93 without danger of leakage, as the ends of the sleeve are rendered steam tight as above described.

The operation of the press may be briefly described as follows: Assume that the upper platen is in its raised position and that the operator has placed the hides, skins, leather or other material upon the lower platen, which is in its lowered position. Under these circumstances the water, oil or other fluid is taken from the hollow standard 35 by the pump (not shown) and circulated through the system of pipes back to the hollow standard, the valve 42 at such time being open; the roller 31 being diametrically opposite to the position shown in Fig. 2 and the stop disk 29 being advanced one half a turn from the position shown in Fig. 2. The operator now depresses the foot treadle 25, which carries with it the link 24 and causes the elbow lever 23 to turn on its pivot and move its long arm toward the right, viewing Fig. 2. The roller 22 carried by the lever 23 travels on the bottom wall of the slot 21 and depresses the short arm of the stop lever 19, thereby elevating the long arm thereof and lifting the finger 27 from the notch 280 in the stop disk. The movement of the stop lever causes the segmental gear 18 to rotate the pinion 17 and its shaft 16, in the proper direction to cause the arm 15 to throw in the clutch (not shown) and set the main shaft 10 in rotation. The shaft 10 through the pinion 13 and gear 12 rotates the counter or crank shaft *f* a half turn, and moves the roller 31 into engagement with the upper end of the lever 33, and by means of the cam 32 of said upper end causes the lever 33 to be turned on its pivot, so as to close the valve 42 at or about the time the upper platen has been lowered into its operative position shown in Figs. 1 and 2, which is effected by the crank *g* connecting rod *h* and toggle *i*, *j*, which latter is brought into its straightened position shown in Fig. 1. When the toggle is straightened, the notch 28 in the stop disk is brought beneath the finger 27 on the stop lever, which is moved into the same by the spring 281, inasmuch as the operator removes his foot from the treadle 25 as soon as the press is set in motion, which he can do, because the clutch is held in its operative position by the stop finger 27 engaging the periphery of the stop disk 29. When the stop lever 19 is turned by the spring 281 to enter the finger 27 in the notch 28, the gear 18 rotates the pinion 17 in the proper direction to cause the arm 15 to throw out the clutch and stop rotation of the crank shaft $f$, with the upper platen in its operative or lowered position. At or about the time the upper platen has been lowered into its operative position, the valve 42 is closed; the circuit of the water or other fluid is interrupted and the fluid taken from the supply by the pump, is forced by the latter through the pipe 51 into the cylinder $c$ and acting on the piston $b$ raises the lower platen and moves the same toward the now stationary upper platen and compresses the work between the said platens.

The work is designed to be subjected to a predetermined pressure, so that all the work of the same kind or class may be uniformly treated, which is effected by adjusting the pressure of the spring 37 by means of the nut 41, so that this spring pressure will be overcome by the fluid pressure, when the latter reaches a predetermined amount, and the valve 42 will be opened by the fluid pressure to reëstablish the circuit of the fluid, and thereby prevent the pressure in the cylinder from being increased beyond the predetermined point, by the pump, which continues in operation. When it is desired to open the press, the operator again depresses the foot treadle and causes the crank shaft $f$ to make a half turn and remove the roller 31 from engagement with the lever 33, and at the same time bring the notch 280 beneath the finger 27, which drops therein and holds the upper platen in its open position into which it has been brought by the crank $g$, and connecting rod $h$ moving the toggles $i$, $j$ into the broken position shown in Fig. 3. As soon as the roller 31 is removed from engagement with the lever 33, the latter is moved by its spring 66 so as to open the valve 42 as above described.

By reference to Fig. 2, it will be seen that the means for adjusting the strength of the spring 37 which holds the valve 42 seated, is accessible from outside of the chamber or boss 36 in which the said spring is located, consequently if required, the operator can adjust the spring substantially in an instant by turning the nut 41, without the necessity of taking any parts off of the press.

Claims:

1. In a machine of the class described, in combination, a cylinder, a piston therein movable by fluid pressure admitted into said cylinder, a platen carried by said piston, a valve for automatically controlling the pressure of the fluid in said cylinder, a lever, means for connecting said valve with said lever to permit the valve to be moved by said lever and to permit the valve to be moved independently of said lever, a second platen coöperating with the first mentioned platen, a lever carrying said second platen, a rotatable shaft, means for connecting said shaft with the lever carrying the second platen, and a device on said shaft coöperating with the lever connected with said valve, substantially as described.

2. In a machine of the class described, in combination, a platen, a lever carrying said platen, a crank shaft, mechanism connecting said crank shaft with said lever, a stop mechanism for said crank shaft, a treadle connected with said stop mechanism, a driving shaft, means for connecting said driving shaft with said crank shaft, a clutch member controlling rotation of said driving shaft, a rotatable shaft to which said clutch member is connected and gearing connecting said rotatable shaft with said stop mechanism to be operated thereby when the latter is operated by said treadle, substantially as described.

3. In a machine of the class described, in combination, a platen, a lever carrying said platen, a rotatable shaft, mechanism connecting said rotatable shaft with said lever, a notched disk on said shaft, a lever having a finger on one arm to enter the notch in said disk and provided with a slot in the other arm, a pin extended into said slot, a treadle, and means for connecting said pin with said treadle, substantially as described.

4. In a machine of the class described, in combination, a platen, a lever carrying said platen, a rotatable shaft, mechanism connecting said rotatable shaft with said lever, a notched disk on said shaft, a lever having a finger on one arm to enter the notch in said disk and provided with a slot in the other arm, a pin extended into said slot, a treadle, and means for connecting said pin with said treadle, said slot having a narrow portion in which the pin is entered when the said finger engages the notch in said disk, for the purpose specified.

5. In a machine of the class described, in combination, a cylinder, a piston therein movable by fluid pressure admitted into said cylinder, a platen carried by said piston, a valve fitting connected with said cylinder and having a valve controlling the flow of fluid through said fitting, a lever connected with said valve to move the latter and to permit the valve to be moved independently of the said lever, said lever having a chamber, a spring located in said chamber and acting on said valve, and an adjusting device for said spring accessible from outside of said chamber, means to move said lever in one direction to close the valve, and means to move the said lever in the opposite direction to open said valve, substantially as described.

In testimony whereof, I have signed my name to this specification in the presence of two subscribing witnesses.

SYVILLA J. PERKINS SMITH,
*Administratrix of estate of Franklin J. Perkins, deceased.*

Witnesses:
S. HOWARD DONNELL,
CHARLES J. POWELL.